(12) United States Patent
Fatula, Jr.

(10) Patent No.: US 8,332,483 B2
(45) Date of Patent: Dec. 11, 2012

(54) APPARATUS, SYSTEM, AND METHOD FOR AUTONOMIC CONTROL OF GRID SYSTEM RESOURCES

(75) Inventor: Joseph John Fatula, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2439 days.

(21) Appl. No.: 10/735,938

(22) Filed: Dec. 15, 2003

(65) Prior Publication Data

US 2005/0131993 A1   Jun. 16, 2005

(51) Int. Cl.
G06F 15/16   (2006.01)

(52) U.S. Cl. ........ 709/218; 709/201; 709/205; 709/223; 709/226

(58) Field of Classification Search .................. 709/218, 709/201, 205, 223, 226
See application file for complete search history.

(56) References Cited

U.S. PATENT DOCUMENTS

| | | | |
|---|---|---|---|
| 5,729,715 A | 3/1998 | Ina et al. | 395/489 |
| 5,771,354 A | 6/1998 | Crawford | |
| 5,813,017 A | 9/1998 | Morris | 707/204 |
| 5,819,020 A | 10/1998 | Beeler, Jr. | 395/182.03 |
| 5,956,733 A | 9/1999 | Nakano et al. | 707/204 |
| 5,974,563 A | 10/1999 | Beeler, Jr. | 714/5 |
| 6,131,148 A | 10/2000 | West et al. | |
| 6,189,079 B1 | 2/2001 | Micka et al. | |
| 6,324,654 B1 | 11/2001 | Wahl et al. | |
| 6,460,082 B1 | 10/2002 | Lumelsky et al. | |
| 6,463,454 B1 * | 10/2002 | Lumelsky et al. | 718/105 |
| 6,505,216 B1 | 1/2003 | Schutzman et al. | |
| 6,526,418 B1 | 2/2003 | Midgley et al. | 707/204 |
| 6,571,257 B1 | 5/2003 | Duggan et al. | 707/202 |
| 6,883,110 B1 | 4/2005 | Goddard | |
| 7,024,668 B2 | 4/2006 | Shiomi et al. | |
| 7,089,383 B2 | 8/2006 | Ji et al. | |
| 7,213,158 B2 | 5/2007 | Bantz et al. | |
| 7,240,015 B1 * | 7/2007 | Karmouch et al. | 705/4 |

(Continued)

FOREIGN PATENT DOCUMENTS

GB   2354350   8/2003

(Continued)

OTHER PUBLICATIONS

Chase et al. "Dynamic virtual clusters in a grid site manager." Jun. 22, 2003. 12th IEEE Internationl Symposium on High Performance Distributed Computing. pp. 90-100.*

(Continued)

Primary Examiner — Larry Donaghue
Assistant Examiner — Nicholas Taylor
(74) Attorney, Agent, or Firm — Kunzler Law Group, PC

(57) ABSTRACT

An apparatus, system, and method are disclosed for autonomic management of data operations and performance resources on a grid computing system. An autonomic management apparatus includes a monitor module, a policy module, and a regulation module. The monitor module is configured to monitor the grid computing system for a trigger event. The policy module is configured to access one of a plurality of system policies. Each of the plurality of system policies corresponds to an operational control parameter of a system resource of the grid computing system. The regulation module is configured to autonomically regulate the system resource in response to a recognized trigger event according to one of the plurality of system policies. The trigger event may be a prediction trigger event, an initiation trigger event, a regulation trigger event, or a termination trigger event.

18 Claims, 7 Drawing Sheets

U.S. PATENT DOCUMENTS

| | | | |
|---|---|---|---|
| 7,296,088 | B1 | 11/2007 | Padmanabhan et al. |
| 2002/0013832 | A1 | 1/2002 | Hubbard |
| 2002/0019844 | A1* | 2/2002 | Kurowski et al. ............. 709/201 |
| 2002/0124137 | A1 | 9/2002 | Ulrich et al. ................... 711/113 |
| 2002/0169877 | A1 | 11/2002 | Bantz et al. |
| 2002/0184249 | A1 | 12/2002 | Shibata ......................... 707/204 |
| 2002/0194340 | A1 | 12/2002 | Ebstyne et al. |
| 2003/0154238 | A1* | 8/2003 | Murphy et al. ............... 709/201 |
| 2003/0208523 | A1* | 11/2003 | Gopalan et al. ............... 709/201 |
| 2004/0039829 | A1 | 2/2004 | Bucher |
| 2004/0064480 | A1 | 4/2004 | Bartlett et al. |
| 2004/0083245 | A1 | 4/2004 | Beeler, Jr. |
| 2004/0153545 | A1 | 8/2004 | Pandya et al. |
| 2005/0027863 | A1 | 2/2005 | Talwar et al. |
| 2005/0044226 | A1 | 2/2005 | McDermott et al. |
| 2005/0125537 | A1 | 6/2005 | Martins et al. |

FOREIGN PATENT DOCUMENTS

| | | | |
|---|---|---|---|
| JP | 05-101640 | | 4/1993 |
| JP | 2000-172657 | | 6/2000 |
| JP | 2001-251307 | | 9/2001 |
| JP | 2002-108839 | | 4/2002 |
| JP | 2002-207712 | | 7/2002 |
| JP | 2002-259146 | | 9/2002 |
| JP | 2003-124976 | | 4/2003 |
| TW | 565801 | | 12/2003 |
| WO | 0203203 | A2 | 10/2002 |
| WO | 03052590 | A1 | 6/2003 |

OTHER PUBLICATIONS

Fu et al. "Sharp: An Architecture for Secure Resource Peering," Oct. 19, 2003, ACM SOSP, ACM SOSP'03, pp. 133-148.*

Andrew A. Chien et al., "Resource Management in the Entropia System," 'Grip Resource Management: State of the Art and Future Trends,' Springer, 1 edition, Sep. 2003.

Bithika Khargharia et al., "vGrid: A Framework for Building Autonomic Applications," '1st International Workshop on Challenges of Large Application in Distributed Environment' (CLADE2003), Jun. 21, 2003, IEEE.

Nobutoshi Sagawa et al, "R&D Activities Toward Realization of the Information Lifeline", Hitachi Hyoron, Jul. 2003, vol. 85, No. 7.

Pazel et al., "Neptune: A Dynamic Resource Allocation and Planning System for a Cluster Computing Utility", Proceedings of the 2nd IEEE/ACM International Symposium on Cluster Computing and the Grid, May 2002.

Bhattacharya et al., "Coordinating Backup/Recovery and Data Consistency Between Database and File Systems", International Conference on Management of Data; Year of Publication 2002.

Bolosky et al., "Feasibility of a Serverless Distributed File System Deployed on an Existing Set of Desktop PCs", Joint International Conference on Measurement and Modeling of Computer Systems; Year of Publication 2000.

C. Anglano et al., "An Accounting System for the Datagrid Project", Feb. 27, 2002, XP002354137.

Fox et al., "A Summary of Grid Computing Environments", Concurrency and Computation: Practice and Experience; vol. 14, Issue 13-15, pp. 1035-1044 ( Nov.-Dec. 2002).

IBM White Paper on "Grid Computing: Distributed Advantage", Nov. 2001.

Schwiegelshohn et al., "Attributes for Communication Between Scheduling Instances", Dec. 4, 2003, pp. 1-10.

* cited by examiner

APPARATUS, SYSTEM, AND METHOD FOR AUTONOMIC CONTROL OF GRID SYSTEM RESOURCES

BACKGROUND OF THE INVENTION

1. Field of the Invention

This invention relates to grid computing and more particularly relates to autonomic control of performance resources in a grid computing system.

2. Description of the Related Art

Grid computing is a relatively new technology in the computing industry. Many current grid computing systems are designed to allow multiple interconnected computers, or nodes, to work together on large grid applications, such as computational problems, that would be impossible to do on a single machine. In order to feasibly manage such overwhelming amounts of computational processing, the computational problem may be divided into several smaller, more manageable jobs. This type of shared processing of grid applications is possible in part because of the enforced or incidental idle processor time of many personal and business computers.

Additionally, grid computing systems may allow for shared storage across a plurality of nodes within the system. In this way, data may be stored remotely on the system, in the form of a backup, for example, and allow large amounts of data to be virtually stored by a single node.

One of the major issues in designing and implementing grid computing systems is resource management. Managing the performance resources available to the grid computing system is fundamental to the efficacy of the system. For example, with various disparate storage, memory, and processing resources available from the many nodes in a grid computing system, somehow these performance resources must be utilized within the grid system in an organized and productive manner.

Conventional grid systems typically implement a stimulus-response environment in which operations and commands are executed simply in response to a given stimulus. For example, if a grid application requires certain processor capacities or a particular amount of storage space, then that amount of processor capacity or storage space may simply be assigned for execution of the grid application. This type of stimulus-response environment does not account for the dynamic nature of distributed computing, in which many performance resources may be dynamically allocated, reclaimed, reserved, and so forth. Due to an inability to regulate grid application operations within such a dynamic environment, grid computing operations must be kept relatively simple to conform to a simple stimulus-response environment.

Consequently, a need exists for an apparatus, system, and method that facilitate favorable autonomic control of performance resources on a grid computing system. Beneficially, such an apparatus, system, and method would overcome the current limitations on grid applications and grid computing systems.

BRIEF SUMMARY OF THE INVENTION

The present invention has been developed in response to the present state of the art, and in particular, in response to the problems and needs in the art that have not yet been fully solved by currently available grid computing systems. Accordingly, the present invention has been developed to provide an apparatus, system, and method for autonomic management of grid system resources on a grid computing system that overcome many or all of the above-discussed shortcomings in the art.

The apparatus for autonomic management of grid system resources on a grid computing system is provided with a logic unit containing a plurality of modules configured to functionally execute the necessary steps of for autonomic management of grid system resources on a grid computing system. These modules in the described embodiments include a global monitor module, a global policy module, a global regulation module, a global reservation module, a global termination module, a global arbitration module, and a global profile module.

A system of the present invention is also presented for autonomic management of grid system resources on a grid computing system. The system may be embodied in a local area network, a wide area network, a combination of local and wide area networks, one or more wireless networks, an internet-based grid computing network, or any other number of grid computing environments. In particular, the system, in one embodiment, includes a global autonomic management apparatus, a local autonomic management apparatus, a policy module, and a regulation module. The system may further include a subscription manager configured to manage a fee subscription for each of the clients connected to the grid computing system.

A client is also presented for autonomic control of a grid system resource on a grid computing system. In one embodiment, the client is provided with a logic unit containing a plurality of modules configured to functionally execute the necessary steps of autonomic control of a grid system resource on a grid computing system. These modules in the described embodiments include a client monitor module, a client policy module, a client notification module, a client allocation module, a client reclamation module, a client initiation module, a client termination module, and a client profile module.

A method of the present invention is also presented for autonomic management of grid system resources on a grid computing system. The method in the disclosed embodiments substantially includes the steps necessary to carry out the functions presented above with respect to the operation of the described apparatus and system. In one embodiment, the method includes monitoring the grid computing system for a trigger event, accessing one of a plurality of system policies, regulating the system resource in response to a recognized trigger event according to one of the plurality of system policies. In a certain embodiment, each of the plurality of system policies corresponding to an operational control parameter of a system resource of the grid computing system. Furthermore, the trigger event may be an initiation trigger event, a regulation trigger event, or a prediction trigger event.

The method also may include reserving the system resource for a grid system operation, terminating a reservation of a system resource for a grid system operation, arbitrating conflicting grid system operations according to an arbitration policy, and storing a system resource profile. The system resource profile, in one embodiment, identifies a client resource that is allocated to the grid system.

One embodiment of the present invention beneficially allows dynamically allocated performance resources to be autonomically managed within a grid computing environment. Additionally, another embodiment of the present invention beneficially allows clients to autonomically allocate and reclaim performance resources within the grid computing system. A further embodiment beneficially enables the global autonomic management apparatus to autonomically reserve allocated performance resources for specific grid applications and operations.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
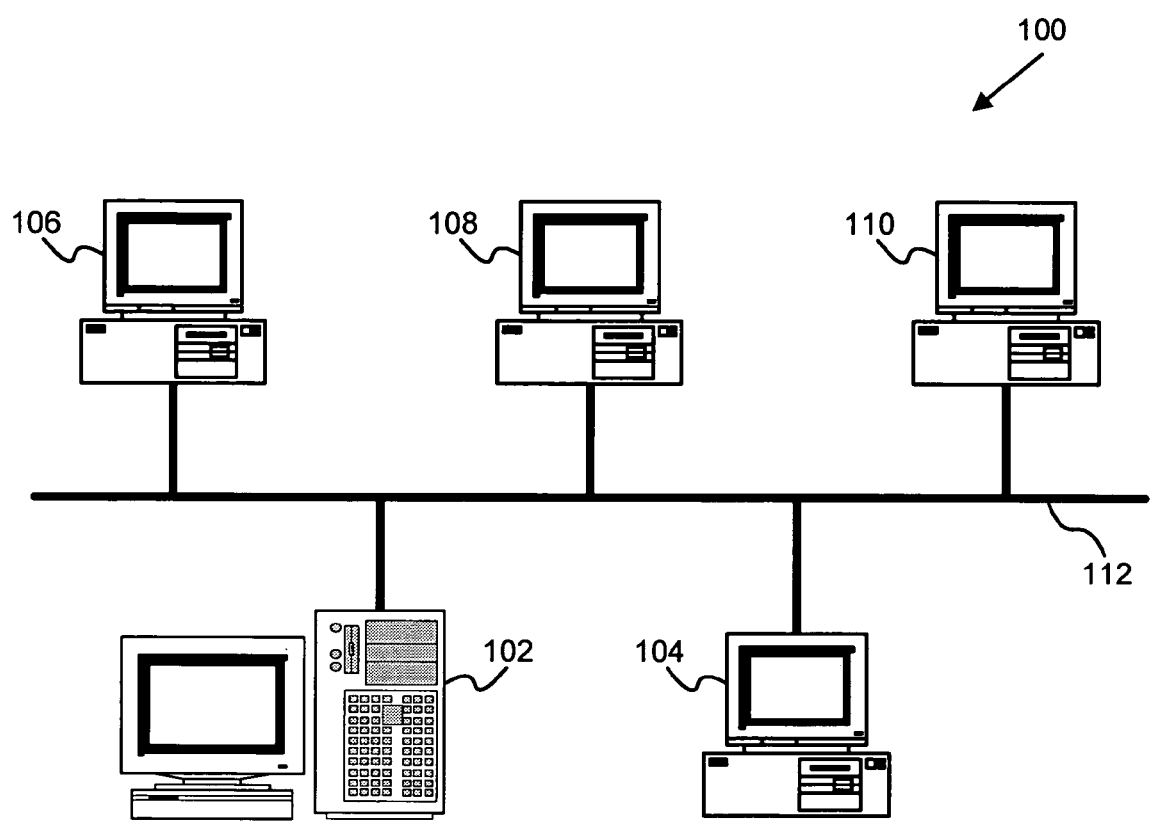
FIG. 1 is a schematic block diagram illustrating one embodiment of a grid system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, databases, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 depicts a grid system 100 that comprises a grid server 102 connected to multiple clients 104-110, or nodes, via a communications channel 112. The illustrated grid system 100 is similar to a local area network (LAN), and the communications channel 112 may be, in one embodiment, an Ethernet communications channel, a wireless communications channel, or another equivalent communications channel. Likewise, the communications channel 112 may comprise a combination of various types of communications channels. Although the depicted grid system 100 includes one grid server 102 and four clients 104-110, the grid system 100 may comprise a combination of various network configurations having fewer or more clients 104, more than one server 102, or alternate server configurations. In a further embodiment, the grid system 100 also may include a subscription manager (not shown) as described with reference to FIG. 2. In one embodiment, the grid server 102 may concurrently act as the subscription manager of the grid system 100.

The grid system 100 is configured, in one embodiment, to execute a grid application. A grid application is a collection of work items that together achieve a specified objective. For example, a grid application may determine very complex mathematical calculations, including weather forecasting, stock market development, and so forth. A grid application also may process large-scale multimedia operations. In another embodiment, a grid application may perform data backup operations on large and diverse amounts of data. In each of these scenarios, execution of a grid application may require the cooperation of several nodes 104-110 within the grid system 100.

A grid application may be divided into jobs, or single units of work. The several jobs of a grid application may be executed concurrently, serially, or co-dependently on one or more of the various nodes 104-110. Each of the nodes 104-110 may allocate certain performance resources to the grid system 100 for execution of grid applications. These performance resources made available by the clients 104-110 may include processor capability, processor capacity, storage capacity, memory capacity, and other similar resources. In one embodiment, a client 104-110 may dedicate a specific amount of total processor capability, storage capacity, or memory capacity to the grid system 100 for execution of grid applications.

Each client 104-110 may act as either a source client or a resource client, depending on the role of the client 104-110 in a particular grid application. For example, where the client 104-110 initiates a grid application, the client 104-110 acts as a source client. Alternately, where the client 104-110 makes local performance resources available for execution of a remotely initiated grid application, the client 104-110 acts as a resource client. For example, in the case of a grid backup operation, a source client may have backup data files on one or more resource clients where the resource clients allocate some available storage to the grid system 100 for such backup grid applications. In a further embodiment, the grid server 102 also may act as a client on the grid system 100 in that it may initiate grid applications and make local performance resources available to the grid system 100, in addition to acting as a server 102 for the network 100.

Figure 2:
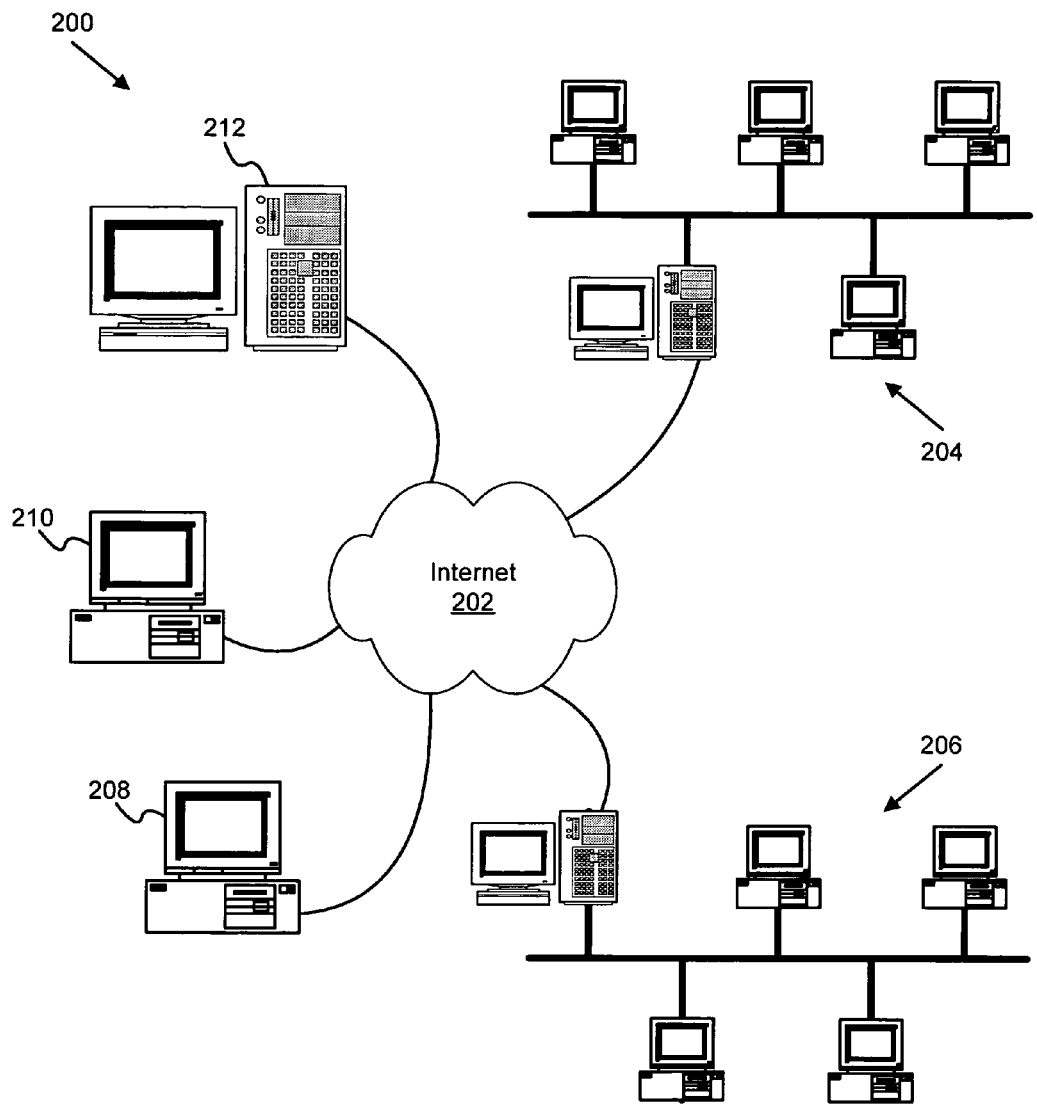
FIG. 2 is a schematic block diagram illustrating another embodiment of a grid system in accordance with the present invention.

FIG. 2 depicts another embodiment of a grid system 200 that is similar in some aspects to the grid system 100 of FIG. 1. The illustrated grid system 200 operates over the internet 202, which provides a communications channel among the various other components of the grid system 200. The illustrated grid system 200 also includes network systems 204, 206, which are similar to the grid system 100 shown in FIG. 1, that form sub-systems within the grid system 200 of FIG. 2. Additionally, the grid system 200 may include other clients 208, 210 that are directly connected to the internet in that they are not a part of a local network.

The grid system 200 also may include a subscription manager 212 configured to manage a client subscription to the grid computing system 200. The subscription manager, in one embodiment, may manage the use of the grid system 100 by a subscribed client in terms of client fees or permission for a client to use a grid system resource or expect a certain level of service from the grid computing system 100. The subscription manager 212 may alternatively be connected to other network systems 204, 206 within the grid system 200. In a further embodiment, the grid system 200 may have multiple subscription managers 212 that each manages independently defined subscription groups.

As mentioned above, other similar grid system configurations may be employed in place of or in addition to the grid systems 100, 200 depicted in FIGS. 1 and 2. In the following description, reference to either of the grid systems 100, 200 is meant to interchangeably refer to either or both of the grid systems 100, 200, unless the exclusion of one of the grid systems 100, 200 is explicitly noted.

Figure 3:
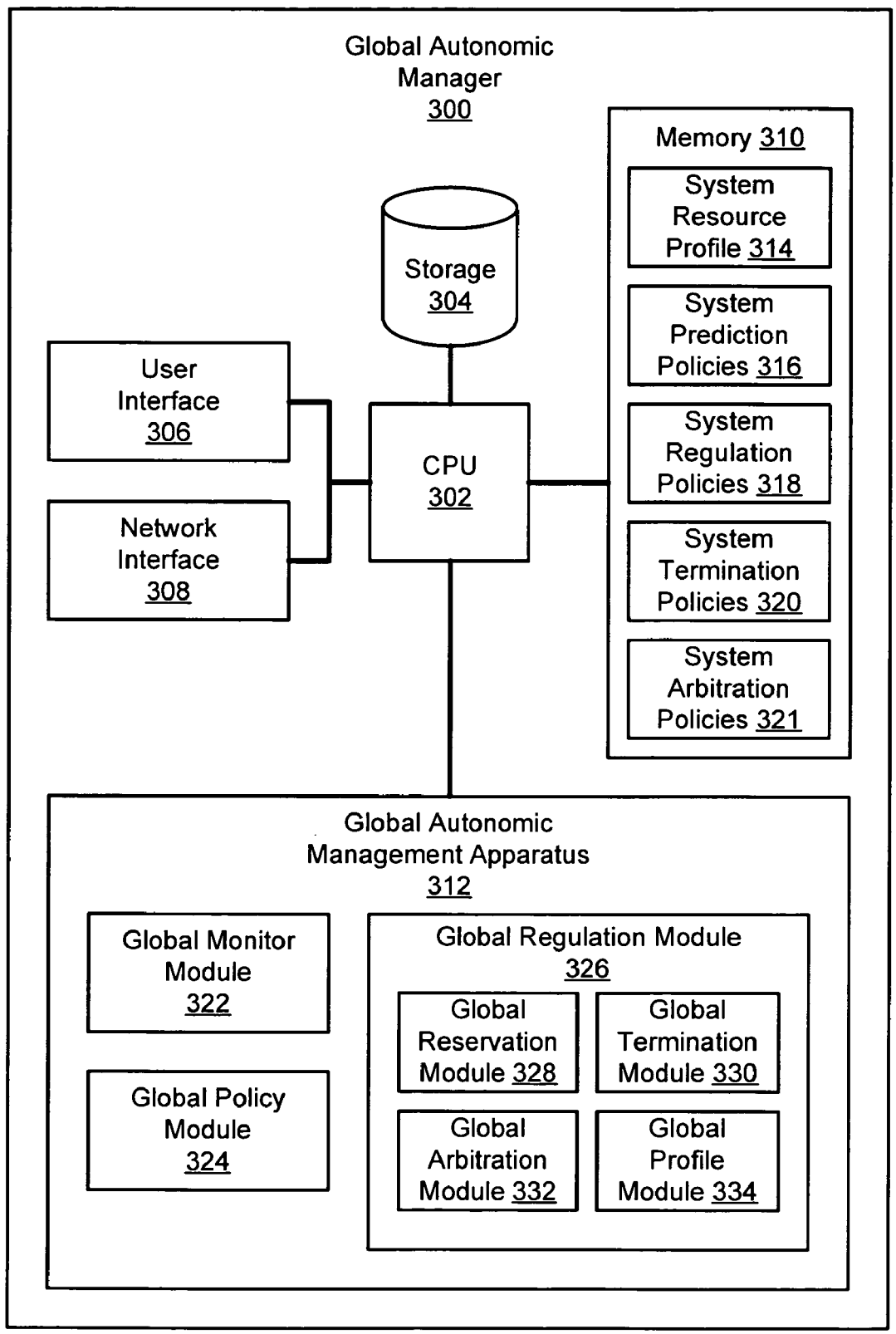
FIG. 3 is a schematic block diagram illustrating one embodiment of a global autonomic manager in accordance with the present invention.

FIG. 3 depicts one embodiment of a global autonomic manager 300. The illustrated global autonomic manager 300 is configured, in one embodiment, to facilitate autonomic control of performance resources on the grid system 100. In one embodiment, the global autonomic manager 300 includes a central processing unit (CPU) 302, a local storage device 304, a user interface 306, a network interface 308, a memory 310, and a global autonomic management apparatus 312. The CPU 302 is configured generally to execute operations within the global autonomic manager 300. The user interface 306, in one embodiment, is configured to allow a user to interact with the global autonomic manager 300, including allowing input data and commands from a user and communicating output data to the user. The network interface 308 is configured, in one embodiment, to facilitate network communications of the global autonomic manager 300 over the communications channel 112 of the grid network 100.

The local memory 310 is configured, in one embodiment, to store several data and metadata files that may be used in conjunction with the autonomic control of grid performance resources. In an alternative embodiment, some or all of these data and metadata files may be replicated in the local storage device 304. In a further embodiment, one or all of these data and metadata files may be stored exclusively in the local storage device 304 rather than in the memory 310. Similarly, these data and metadata files may be stored on a combination of local memory 310 and storage 304. In another embodiment, one or all of these data and metadata files may be stored in distributed storage on the grid system 100. Although the present description refers to "files," the present invention is understood to operate in substantially the same manner using other electronic memory and storage structures. Reference herein to a data file or metadata file is understood to equivalently refer to other such electronic memory and storage structures.

In particular, the memory 310 may store a system resource profile 314, one or more system prediction policies 316, one or more system regulation policies 318, one or more system termination policies 320, and one or more system arbitration policies 321. The system resource profile 314, in one embodiment, is configured to store one or more parameters indicating the specific performance resources dedicated or allocated to the grid system 100. The system prediction policies 316, in one embodiment, are configured to define one or more prediction trigger events and indicate what action the global autonomic manager 300 will take in response to a recognized prediction trigger event.

Likewise, the system regulation policies 318, in one embodiment, are configured to define one or more regulation trigger events and indicate what action the global autonomic manager 300 will take in response to a recognized regulation trigger event. Similarly, the system termination policies 320, in one embodiment, are configured to define one or more termination trigger events and indicate what action the global autonomic manager 300 will take in response to a recognized termination trigger event. Furthermore, the system arbitration policies 321 are configured, in one embodiment, to store one or more arbitration policies that indicate what action the global autonomic manager 300 will take in response to a recognized conflict.

A trigger event may include any action that is defined by one of the policies 316, 318, 320, 321 described above. For example, a trigger event may comprise a change in data flow, a change in time, a scheduled time, a grid operation, a client operation, an automatic operation, a manual operation, a user request, or any of a variety or combination of these and other types of client, grid, user, and other monitored actions.

The global autonomic management apparatus 312 is configured, in one embodiment, to facilitate autonomic control of performance resources on the grid system 100. The illustrated global autonomic management apparatus 312 includes a global monitor module 322, a global policy module 324, and a global regulation module 326.

In one embodiment, the global monitor module 322 is configured to monitor the grid system 100 for a trigger event defined by one of the system prediction, regulation, or termination policies 316, 318, 320. The global policy module 324, in one embodiment, is configured to allow a user to access and define the system prediction, regulation, or termination policies 316, 318, 320.

The global regulation module 312 is configured, in one embodiment, to autonomically regulate the performance resources on the grid system 100 in response to a recognized trigger event and according to the system prediction, regulation, or termination policies 316, 318, 320. The depicted global regulation module 326 includes a global reservation module 328, a global termination module 330, a global arbitration module 332, and a global profile module 334.

The global reservation module 328, in one embodiment, is configured to reserve a performance resource on the grid system 100 for a specific grid application or grid system operation. In a similar manner, the global termination module 330 is configured, in one embodiment, to terminate the reservation of a performance resource for a specific grid application. In this way, the global autonomic management apparatus 312 may assign and unassign certain allocated performance resource on the grid system 100 for execution of specific grid applications or jobs.

In one embodiment, the global arbitration module 332 is configured to arbitrate among competing grid application requirement and conflicting performance resource assignments. For example, the global arbitration module 332 may temporarily suspend assignment or execution of a job that is assigned to a performance resource that is currently in use. In a further embodiment, the global arbitration module may be configured to arbitrate between conflicting grid system operations and local client operations. It is possible, for example, that a client 104-110 may reclaim a performance resource that was previously assigned to be used by the grid system 100. In this case, it may be necessary to re-execute the aborted grid operation or to assign alternative performance resources to complete the suspended grid operation.

The global profile module 334, in one embodiment, may be configured to manage the system resource profile 314. In one embodiment, the global profile module 334 may track the available performance resources throughout the grid system 100. In a further embodiment, the global profile module 334 also may track the usage of available performance resources on the grid system 100. Additionally, the global profile module 334 may be configured to synchronize the system resource profile 314 with a similar profile on one or more of the clients 104-110.

Figure 4:
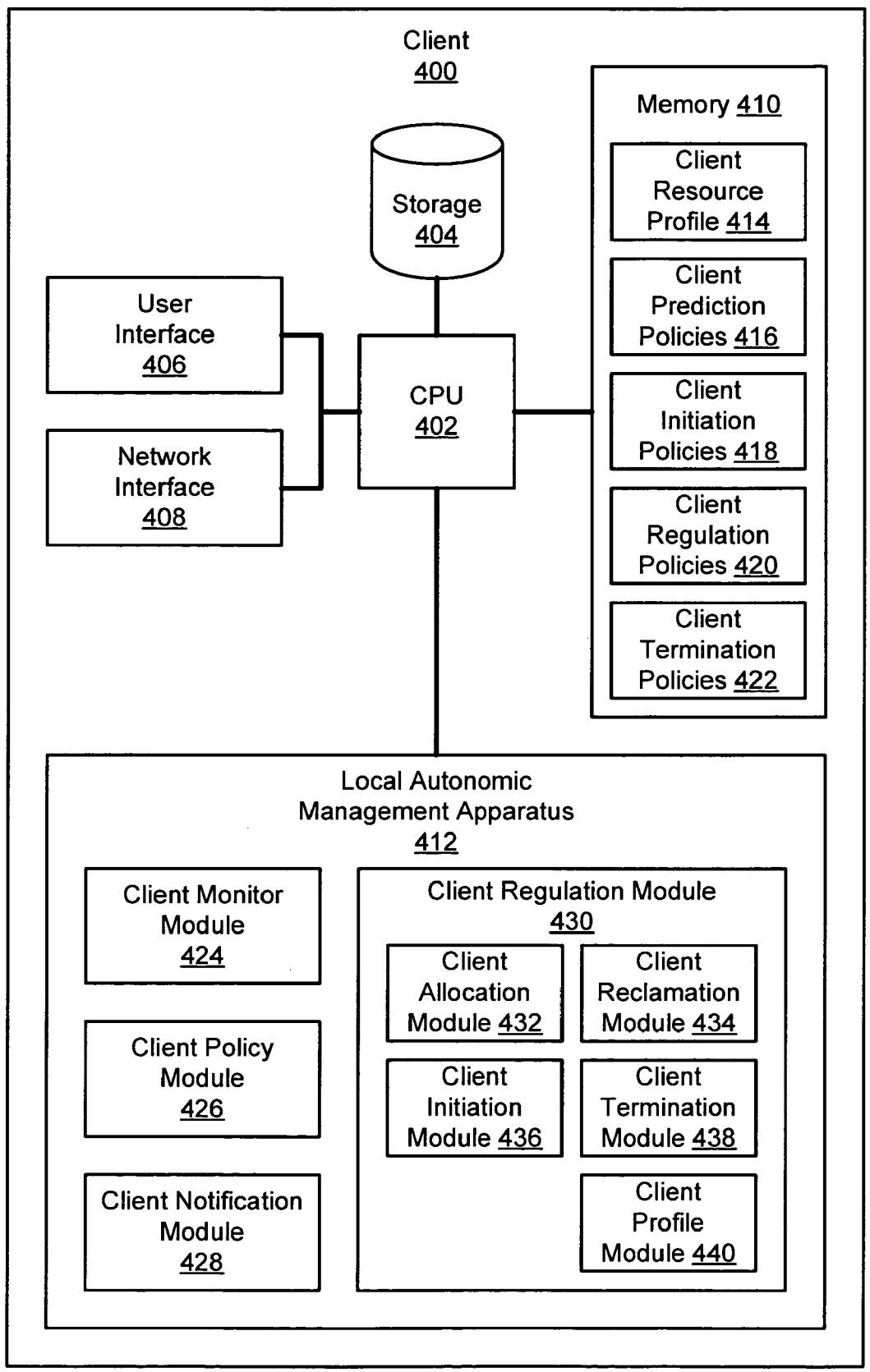
FIG. 4 is a schematic block diagram illustrating one embodiment of a client in accordance with the present invention.

FIG. 4 depicts one embodiment of a client 400 that may operate as either a source client or a resource client within the grid system 100. Like the global autonomic manager 300 of FIG. 3, the client 400 includes a CPU 402, a local storage device 404, a user interface 406, a network interface 408, and a memory 410. The illustrated client 400 also includes a local autonomic management apparatus 412. The CPU 402, user interface 406, and network interface 408 of the client 400 are substantially similar to the CPU 302, user interface 306, and network interface 308 of the global autonomic manager 300.

The memory 410, in one embodiment, may be configured to store a client resource profile 414, one or more client prediction policies 416, one or more client initiation policies 418, one or more client regulation policies 420, and one or more client termination policies 422. The client resource profile 414 may be similar to the system resource profile 314 of the global autonomic manager 300. However, the client resource profile 414 is configured to store one or more parameters indicating the specific performance resources dedicated to the grid system 100 by the client 400. For example, the client may dedicate bandwidth, storage, memory, processor cycles, input/output devices, and so forth to be used for a grid application.

The client prediction policies 416, client regulation policies 420, and client termination policies 422 may be similar to the system prediction policies 316, system regulation policies 318, and system termination policies 320, respectively, on the global autonomic manager 300. For example, the client prediction policies 416 may include a policy to request that the global autonomic management apparatus 312 reserve grid performance resources in anticipation of a grid application originating from the requesting client 400.

However, these client policies 416, 420, 422 may be specific to the client 400 in terms of the client performance resources dedicated to the grid system 100. For example, the client regulation policies 420 may include policies that regulate the allocation of client performance resources according to the amount of grid operations originating from the client 400. In a certain embodiment, if the client 400 is initiating a substantial amount of grid system operations, the client 400 may allocate additional performance resources to the grid system 100 according to a client regulation policy 420.

The client initiation policies 416, in one embodiment, include policies that indicate what action the client 400 will take in response to a given initiation trigger event. For example, the client initiation policies 416 may include policies that regulate when a grid application is initiated. For instance, a client initiation policy 316 may specify that grid applications are only initiated after working hours, during lunch hour, when the client processor is idle for a specified time period, and so forth.

The illustrated local autonomic management apparatus 412, in one embodiment, may be configured to facilitate autonomic control of performance resources on the grid system 100. The depicted local autonomic management apparatus 412 includes a client monitor module 424, a client policy module 426, a client notification module 428, and a client regulation module 430.

In one embodiment, the client monitor module 424 is configured to monitor the client 400 for a trigger event defined by one of the client prediction, initiation, regulation, or termination policies 416, 418, 420, 422. The client policy module 426, in one embodiment, is configured to allow a user to access and define the client prediction, initiation, regulation, or termination policies 416, 418, 420, 422. The client notification module 428 is configure, in one embodiment, to notify the global autonomic manager 300 of pertinent activity on the client 400, such as modification of the client resource profile 414, initiation of a grid application, termination of a grid application, and so forth.

The client regulation module 430 is configured, in one embodiment, to autonomically regulate the performance resources on the client 400 in response to a recognized trigger event and according to the client prediction, initiation, regulation, or termination policies 416, 418, 420, 422. The depicted client regulation module 430 includes a client allocation module 432, a client reclamation module 434, a client initiation module 436, a client termination module 438, and a client profile module 440.

The client allocation module 432 is configured, in one embodiment, to allocate a client performance resource to the grid system 100 according to the client resource profile 414. As mentioned above, the client performance resource may be any performance resource that the client 400 may make available for grid system operations, including client accessibility, client bandwidth, client processor, client storage, client memory, and so forth. In a similar manner, the client reclamation module 434, in one embodiment, is configured to reclaim a client performance resource that is allocated to the grid system 100. Reclaiming a client performance resource makes the resource unavailable to the grid system 100. Hence, the global autonomic management apparatus 312 cannot reserve, via the global reservation module 328, a reclaimed client performance resource. In this way, the local autonomic management apparatus 412 may allocate and reclaim performance resources on the grid system 100, for example, when such performance resources are not being utilized by the client 400.

The client initiation module 436, in one embodiment, is configured to initiate a grid application on the grid system 100 in response to an initiation trigger event and according to the client initiation policies 418. Similarly, the client termination module 438 is configured, in one embodiment, to terminate a grid application initiated by the client 400 in response to a termination trigger event and according to the client termination policies 422.

The client profile module 440, in one embodiment, may be configured to manage the client resource profile 414. In one embodiment, the client profile module 440 may track the allocated client performance resources. In a further embodiment, the client profile module 440 also may track the usage of allocated client performance resources. Additionally, the client profile module 440 may be configured to synchronize the client resource profile 414 with the system resource profile 314 on the global autonomic manager 300.

The following schematic flow chart diagrams that follow are generally set forth as logical flow chart diagrams. As such, the depicted order and labeled steps are indicative of one embodiment of the presented process. Other steps and processes may be conceived that are equivalent in function, logic, or effect. Additionally, the format and symbology employed are provided to explain the logical steps of the process and are understood not to limit the scope of the process. Likewise, although various arrow types and line types may be employed in the flow chart diagrams, they are understood not to limit the scope of the corresponding process. Indeed, some arrows or other connectors may be used to indicate only the logical flow of the process. For instance, an arrow may indicate a waiting or monitoring period of unspecified duration between enumerated steps of the depicted process.

Figure 5:
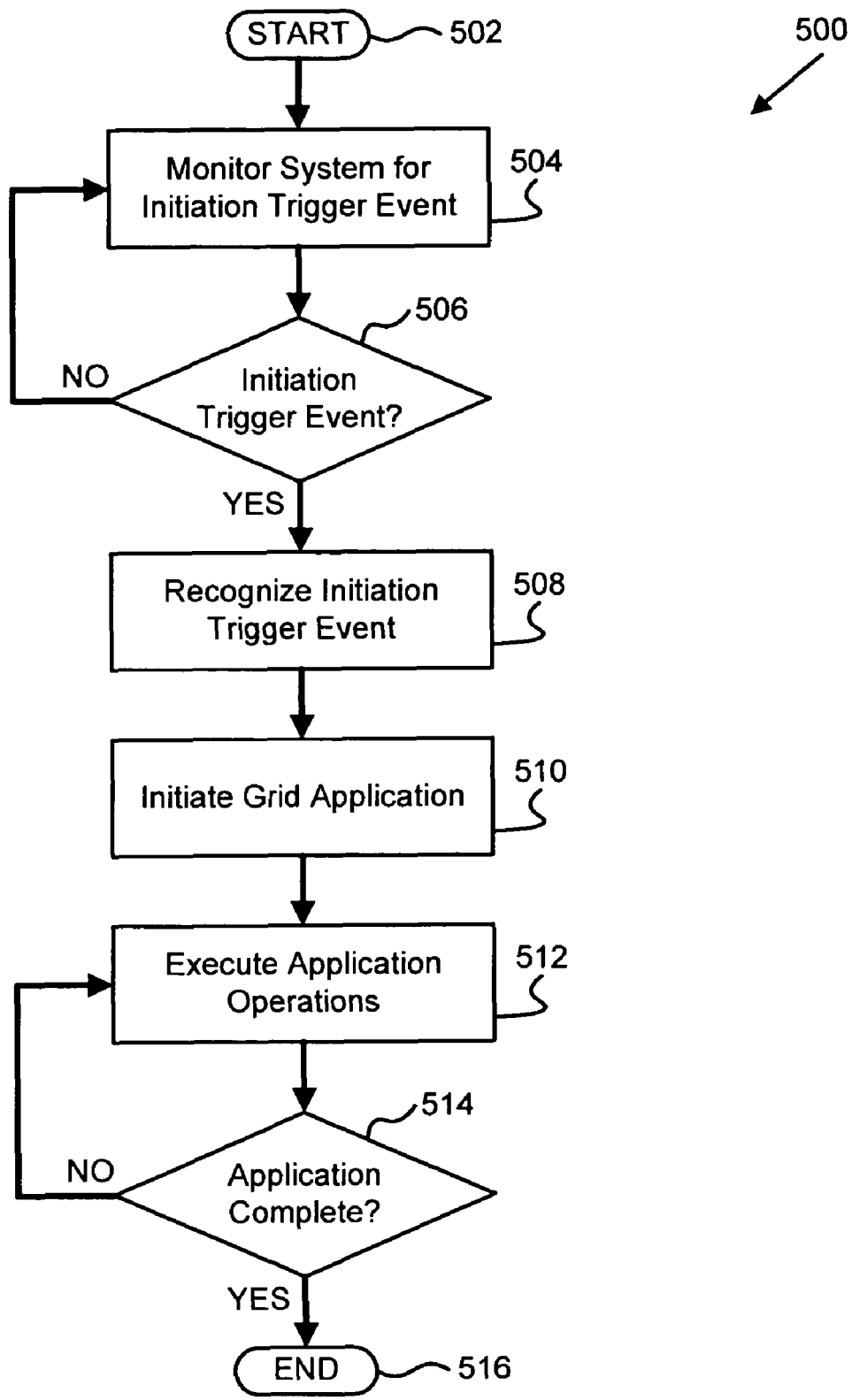
FIG. 5 is a schematic flow chart diagram illustrating one embodiment of a stimulus response method in accordance with the present invention.

FIG. 5 depicts one embodiment of an autonomic initiation method 500 that may be employed by the local autonomic management apparatus 412 on the client 400. The illustrated autonomic initiation method 500 begins 502 as the client 400 monitors 504 for an initiation trigger event. In one embodiment, the client 400 may employ the client monitor module 424 to monitor for an initiation trigger event. The initiation trigger event, in one embodiment, is defined by one of the client initiation policies 418.

The autonomic initiation method 500 continues 506 to monitor 504 for an initiation trigger event until the client 400 recognizes 508 a defined initiation trigger event. The client 400 then initiates 510 the appropriate grid application as indicated by the client initiation policies 418. In one embodiment, the client 400 employs the client initiation module 436 to initiate the grid application and notifies the global autonomic manager 300 via the client notification module 428. The client 400 then executes the grid application over the grid system 100 until the grid application is complete 514. The depicted autonomic initiation method 500 then ends 516.

Figure 6:
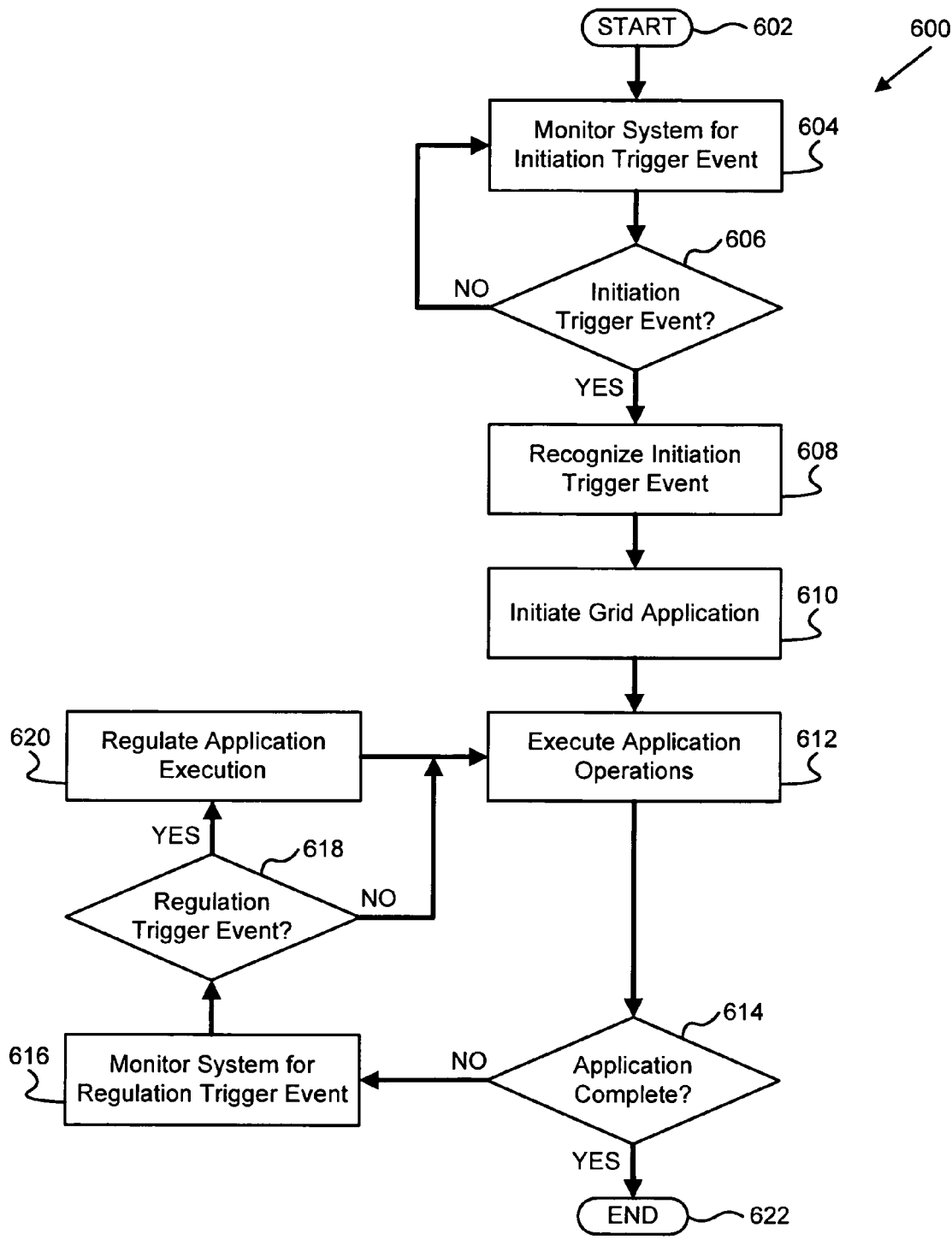
FIG. 6 is a schematic flow chart diagram illustrating one embodiment of an autonomic regulation method in accordance with the present invention.

FIG. 6 depicts one embodiment of an autonomic regulation method 600 that may be employed by either the global autonomic management apparatus 312 on the global autonomic manager 300 or the local autonomic management apparatus 412 on the client. The illustrated autonomic regulation method 600 begins 602 in the same was as the autonomic initiation method 500 described above. In fact, the autonomic regulation method 600, in one embodiment, follows substantially the same steps 604, 606, 608 to initiate 610 the grid application as the autonomic initiation method 500.

However, while the grid application operations are being executed 612 on the grid system 100 and before the grid application is completed 614, the autonomic regulation method 600 monitors the grid system 100 for a regulation trigger event. In one embodiment, the client 400 may employ the client monitor module 424 to monitor for a regulation trigger event. In a further embodiment, the global autonomic manager 300 may employ the global monitor module 322 to monitor for a regulation trigger event. The regulation trigger event, in one embodiment, is defined by one of the client regulation policies 420. Alternately, the regulation trigger event may be defined by one of the system regulation policies 318.

If a regulation trigger event is not recognized 618, the grid application continues to execute normally. However, if a regulation trigger event is recognized 618, the autonomic regulation method 600 regulates 620 the performance resources according to the corresponding client regulation policies 420 or system regulation policies 318. The autonomic regulation method 600 may regulate 620 the performance resources, in one embodiment, by reserving additional performance resources for the grid application or by terminating existing performance resource reservations. Alternately, the autonomic regulation method 600 may regulate 620 the performance resources by allocating or reclaiming client performance resources, or even by terminating the grid application via the client termination module 438.

The grid system 100 continues to execute the grid application, subject to the autonomic regulations invoked, until the grid application is either terminated by the client 400 or global autonomic manager 300, or until the grid application is complete 614. The depicted autonomic regulation method 600 then ends 622.

Figure 7:
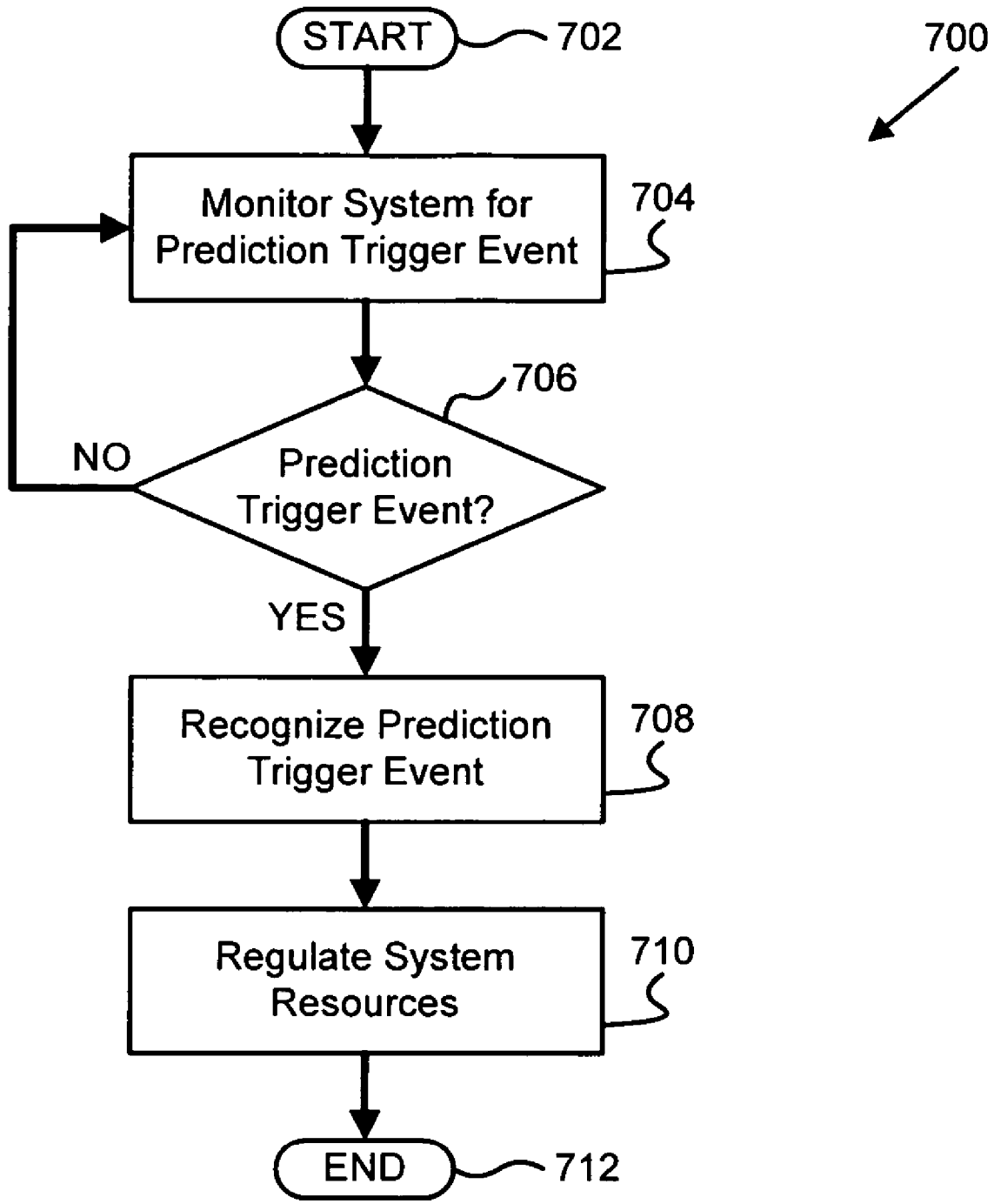
FIG. 7 is a schematic flow chart diagram illustrating one embodiment of an autonomic prediction method in accordance with the present invention.

FIG. 7 depicts one embodiment of an autonomic prediction method 700 that may be employed by either the global autonomic management apparatus 312 on the global autonomic manager 300 or the local autonomic management apparatus 412 on the client. The autonomic prediction method 700 is invoked, in one embodiment, prior to the initiation of a grid application. In a further embodiment, the autonomic prediction method 700 may be invoked prior to recognizing 508, 608 an initiation trigger event, as described with reference to FIGS. 5 and 6.

The illustrated autonomic prediction method 700 begins 702 by monitoring 704 for a prediction trigger event. In one embodiment, the client 400 may employ the client monitor module 424 to monitor for a prediction trigger event. In a further embodiment, the global autonomic manager 300 may employ the global monitor module 322 to monitor for a prediction trigger event. The prediction trigger event, in one embodiment, is defined by one of the client prediction policies 416. Alternately, the prediction trigger event may be defined by one of the system prediction policies 316.

The autonomic prediction method 700 continues 706 to monitor 704 for a prediction trigger event until the client 400 recognizes 708 a defined prediction trigger event. The client 400 then regulates 710 the performance resources of the client 400 or grid system 100 as indicated by the client prediction policies 416 or the system prediction policies 316, respectively. The autonomic prediction method 700 may regulate 710 the performance resources, in one embodiment, by reserving additional performance resources for the grid application or by terminating existing performance resource reservations. Alternately, the autonomic prediction method 700 may regulate 710 the performance resources by allocating or reclaiming client performance resources via the client allocation module 432 and client reclamation module 434, respectively. Additionally, the client 400 may notify the global autonomic manager 300 of changes to performance resource allocations and the client resource profile 414 via the client notification module 428. The depicted autonomic prediction method 700 then ends 712.

As one example of the foregoing methods 500, 600, 700, the global autonomic manager 300 may monitor the performance of the grid applications on the grid computing system 100. While monitoring the performance of grid, if the overall performance begins to slow down, the global regulation module 326 may invoke system regulation policy 318 to increase the amount of performance resources allocated to the grid application.

For example, a movie studio may perform a rendering project that is due on a particular date. To meet this deadline, the project managers or business executives may decide to increase the client performance resources available to the grid system 100. In one embodiment, increasing the performance resources for one grid application may reduce the performance resources available to other clients and grid applications on the grid system 100. In this way, the regulation policy 318 defines the action to be taken in response to the request for increased resources. Additionally, the global autonomic management apparatus 312 helps the global autonomic manager 300 and the client 400 to manage the grid application in order to meet the project deadline. In an alternate embodiment, the request for increased performance resources may occur autonomically according to regulation policies 318 defining project constraints and deadlines.

In another embodiment, a high level regulation policy 318 may be defined to alter the performance resources available to the grid system 100 and to the client 400 based on the overall performance of the grid system 100. For instance, using the same rendering example discussed above, a regulation policy 318 may allow client performance resources to be dynamically reclaimed by the client 400 if the rendering grid application is not currently making use of the allocated client performance resources. Similarly, the reclaimed client performance resources may be reallocated to the rendering grid application when they are requested to perform additional rendering grid application operations. This is one embodiment of dynamic regulation policy 318.

Many other autonomic prediction, initiation, regulation, termination, and arbitration policies may be employed in a variety of grid systems 100 and application environments. For instance, the policy may define an on/off control. That is, if the demand for its service is required it is turned on, otherwise it is off. In another embodiment, the policy may define a proportional control. That is, if the demand has increased or decreased, the resources may be allocated or reclaimed in proportion to the demand. In another embodiment, the policy may be time delayed or phased, according to a step change in demand. For example, the performance resources may be gradually allocated or reclaimed over some period of time until the proper level or resource availability and allocation is achieved.

With regard to the prediction policies, the global autonomic manager 300 may collect and use historical or other information to predict when a particular load, resource availability, resource allocation, etc., may need to change. For example, the local processing load on a client 400 may adversely affect performance resource availability on the grid system 100 at a certain time each day. A predictive policy allows the global autonomic manager 300 and client 400 to predictively adjust grid application resource availability in anticipation of a typical resource usage. This might include delaying the grid application or causing the grid application to execute sooner than normal. The particular prediction, initiation, regulation, termination, and arbitration policies are not limited to any particular policy, control algorithm, etc.

In one embodiment, the change in policies at the global autonomic manager 300 or at the client 400 may be coupled to a subscription manager 212. The subscription manager 212, in one embodiment, may adjust the fees depending on the change in service. In another embodiment, that subscription manager 212 may prevent specific or global changes in policies. For example, a business may subscribe to a grid system 100 and choose to contribute some level of performance resources. The fee charged to the business may be proportional to the level of grid application demand and level of performance resources contributed. However, certain upper and/or lower thresholds may be fixed, corresponding with particular financial or other business criteria. In a further embodiment, the subscription manager 212 may block potential changes in one or more policies according to these thresholds.

With further regard to the subscription manager 212, the subscription manager 212, in one embodiment, is an apparatus for managing the information collected, used, or generated in the process of determining user fees, controlling the level of service, controlling the use of the service, controlling the contribution of performance resources, etc. to or for a grid application, from or to a customer, business, etc.

In one embodiment, the subscription manager 212 may serve at least two purposes. First, it may determine the user fees to be charged to a user based on usage of the grid resources by the user and/or contribution of performance resources by the user to the grid. Second, the subscription manager 212 may control the access, use, level of use, and so forth, to the grid system 100 and grid resources. The subscription manager 212 also may control the allocation, level of contribution, and so forth, of client performance resources to the grid system 100 based on autonomic policies described herein.

In order to manage the subscriptions of various clients 400 to the grid system 100, the subscription manager 212 may create and store a client profile, a global profile, and a customer profile. In one embodiment, the global profile of the subscription manager 212 may contain information regarding performance resource allocation and usage in order to determine the user fee for a specific customer. In one embodiment, the global profile of the subscription manager 212 may be generic to all performance resources and clients 400 using the grid system 100.

In one embodiment, the customer profile contains information that relates the global profile to the particular customer. The customer profile may aggregate information about a particular customer, including information about client performance resource allocation and locally invoked grid applications. The customer profile may be used to determine the overall fee that a customer is charged. Similarly, in one embodiment, the client profile in the subscription manager 212 may contain similar information that corresponds to a specific client 400.

In one embodiment, the subscription manager 212 determines user fees based on one or more of the instantaneous, average, maximum, minimum, planned, reserved, peak, and so forth, use of the grid system 100 by client 400 for a grid application. In another embodiment, the subscription manager 212 may track the allocation of client performance resources to the grid system 100 by a client 400. The subscription manager 212 may track one or more of the instantaneous, average, maximum, minimum, planned, reserved, peak, and so forth, level contributed. In a further embodiment, the subscription manager 212 tracks a combination of one or more of the factors listed above.

In another embodiment, the subscription manager 212 may monitor and control the execution of an autonomic policy by a global autonomic manager 300 or the client 400. For example, a business may subscribe to a grid system 100 for a backup retrieve grid application. To keep costs down, the business may decide to contribute performance resources to the grid system 100 from each of the connected clients 400. If a user decides to reclaim the allocated performance resources of a particular client and reduce his contribution to zero, the subscription manager 212 may alter the client profile and customer profile to determine the appropriate fee. According to the global profile of the subscription manager 212, the global autonomic manager 300 of the grid system 100 may maintain upper and lower thresholds for performance resource allocation, thereby preventing such a reclamation of all allocated resources.

In another embodiment, the subscription manager 212 may control a policy change requested by a client 400 or by a global autonomic manager 300. The customer profile of the subscription manager 212 may prevent certain changes to the resource allocation or to the grid application usage of the client 400. For example, the client profile may have a limit on the total cost that a customer may occur in a predetermined billing period. The subscription manager 212 may block certain uses by a client 400 if these limits are exceeded.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An autonomic management apparatus for autonomic management of system resources on a grid computing system, the apparatus comprising:
a storage device storing executable code;
a processor executing the executable code, the executable code comprising:
a monitor module configured to monitor the grid computing system for a predictive trigger event comprising an anticipated change in data flow based on collected historical information;
a policy module configured to access one of a plurality of system policies, each of the plurality of system policies corresponding to an operational control parameter of system resources comprising client processor capacity, client storage capacity, and client memory capacity allocated to the grid computing system, wherein a plurality of clients both provide the system resources and employ the system resources and the plurality of system policies comprises a system prediction policy; and
a regulation module configured to autonomically adjust a system resource allocated to the grid computing system from a client in response to the anticipated change in the data flow and modify a client fee for participation in the grid computing system in response to the adjustment, wherein the client initiates a grid application in response to the anticipated change in data flow, the client fee is proportional to a level of the system resources contributed by the client and a level of grid system demand, and the client fee is based a client use of the grid system selected from the group consisting of instantaneous use, average use, maximum use, minimum use, planned use, reserved use, and peak use.

2. The apparatus of claim 1, wherein the operational control parameter comprises a command to regulate the system resource.

3. The apparatus of claim 1, wherein the regulation module comprises a reservation module configured to reserve the system resource for a grid system operation.

4. The apparatus of claim 1, wherein the regulation module comprises a termination module configured to terminate a reservation of the system resource for a grid system operation.

5. The apparatus of claim 1, wherein the regulation module comprises an arbitration module configured to arbitrate conflicting grid system operations according to an arbitration policy.

6. The apparatus of claim 1, wherein the regulation module comprises a profile module configured to store a system resource profile, the system resource profile identifying the system resource of the client, and the system resource allocated by the client to the grid computing system.

7. The apparatus of claim 1, wherein the plurality of system policies further comprises at least one of a system regulation policy and a system termination policy.

8. A method for autonomic management of system resources on a grid computing system, the method comprising:
monitoring, by use of a processor, the grid computing system for a predictive trigger event comprising an anticipated change in data flow based on collected historical information;
accessing one of a plurality of system policies, each of the plurality of system policies corresponding to an operational control parameter of system resources comprising client processor capacity, client storage capacity, and client memory capacity allocated to the grid computing system, wherein a plurality of clients both provide the system resources and employ the system resources and the plurality of system policies comprises a system prediction policy; and autonomically adjusting a system resource allocated to the grid computing system from a client in response to the anticipated change in the data flow and modifying a client fee for participation in the grid computing system in response to the adjustment wherein the client initiates a grid application in response to the anticipated change in data flow, the client fee is proportional to a level of the system resources contributed by the client and a level of grid system demand, and the client fee is based a client use of the grid system selected from the group consisting of instantaneous use, average use, maximum use, minimum use, planned use, reserved use, and peak use.

9. The method of claim 8, further comprising reserving the system resource for a grid system operation.

10. The method of claim 8, further comprising terminating a reservation of the system resource for a grid system operation.

11. A method for autonomic management of grid system resources on a grid computing system, the method comprising:
monitoring, by use of processor, the grid computing system for a predictive trigger event comprising an anticipated change in data flow based on collected historical information;
accessing one of a plurality of system policies, wherein the plurality of system policies comprises a system prediction policy, each of the plurality of system policies corresponding to an operational control parameter of system resources comprising client processor capacity, client storage capacity, and client memory capacity allocated to the grid computing system, wherein a plurality of clients both provide the system resources and employ the system resources and the plurality of system policies comprises a system prediction policy;
autonomically adjusting a system resource allocated to the grid computing system from a client in response to the anticipated change in the data flow and modifying a client fee for participation in the grid computing system in response to the adjustment, wherein the client initiates a grid application in response to the anticipated change in data flow, the client fee is proportional to a level of the system resources contributed by the client and a level of grid system demand, and the client fee is based a client use of the grid system selected from the group consisting of instantaneous use, average use, maximum use, minimum use, planned use, reserved use, and peak use; and
storing a system resource profile, the system resource profile identifying the system resource of the client.

12. A computer readable storage medium storing executable code executed by a processor to carry out a method for autonomic management of system resources on a grid computing system, the method comprising:
monitoring the grid computing system for a predictive trigger event comprising an anticipated change in data flow based on collected historical information;
accessing one of a plurality of system policies, each of the plurality of system policies corresponding to an operational control parameter of system resources comprising client processor capacity, client storage capacity, and client memory capacity allocated to the grid computing system, wherein a plurality of clients both provide the system resources and employ the system resources and the plurality of system policies comprises a system prediction policy; and
autonomically adjusting a system resource allocated to the grid computing system from a client in response to the anticipated change in the data flow and modifying a client fee for participation in the grid computing system in response to the adjustment, wherein the client initiates a grid application in response to the anticipated change in data flow, the client fee is proportional to a level of the system resources contributed by the client and a level of grid system demand, and the client fee is based a client use of the grid system selected from the group consisting of instantaneous use, average use, maximum use, minimum use, planned use, reserved use, and peak use.

13. The computer readable storage medium of claim 12, wherein the method further comprises reserving the system resource for a grid system operation.

14. The computer readable storage medium of claim 12, wherein the method further comprises terminating a reservation of the system resource for a grid system operation.

15. The computer readable storage medium of claim 12, wherein the method further comprises arbitrating conflicting grid system operations according to an arbitration policy.

16. The computer readable storage medium of claim 12, wherein the method further comprises storing a system resource profile, the system resource profile identifying the system resource of the client, and the system resource allocated by the client to the grid computing system.

17. An apparatus for autonomic management of grid system resources on a grid computing system, the apparatus comprising:
a storage device storing executable code;
a processor executing the executable code, the executable code comprising:
means for monitoring the grid computing system for a predictive trigger event comprising an anticipated change in data flow based on collected historical information;
means for accessing one of a plurality of system policies, each of the plurality of system policies corresponding to an operational control parameter of system resources comprising client processor capacity, client storage capacity, and client memory capacity allocated to the grid computing system, wherein a plurality of clients both provide the system resources and employ the system resources and the plurality of system policies comprises a system prediction policy; and
means for autonomically adjusting a system resource allocated to the grid computing system from a client in response to the anticipated change in the data flow and modifying a client fee for participation in the grid computing system in response to the adjustment, wherein the client initiates a grid application in response to the anticipated change in data flow, the client fee is proportional to a level of the system resources contributed by the client and a level of grid system demand, and the client fee is based a client use of the grid system selected from the group consisting of instantaneous use, average use, maximum use, minimum use, planned use, reserved use, and peak use.

18. The method of claim 8, further comprising blocking a potential change in at least one of the system policies according to a threshold corresponding with a subscription criteria.

* * * * *